United States Patent [19]

Cheng et al.

[11] Patent Number: 4,481,622
[45] Date of Patent: Nov. 6, 1984

[54] HIGH SPEED DIAL-UP TELEPHONE CIRCUIT FULL DUPLEX DATA TRANSMISSION TECHNIQUES

[75] Inventors: King Y. Cheng, Tustin; Arthur J. Carlson, Cupertino, both of Calif.

[73] Assignee: Anderson Jacobson, Inc., San Jose, Calif.

[21] Appl. No.: 364,320

[22] Filed: Apr. 1, 1982

[51] Int. Cl.$^3$ .............................................. H04B 1/50
[52] U.S. Cl. ...................................... 370/30; 370/32
[58] Field of Search .................... 370/30, 24, 69.1, 32; 179/170.2

[56] References Cited

U.S. PATENT DOCUMENTS

| | | | |
|---|---|---|---|
| 3,226,480 | 12/1965 | Wright et al. | 370/30 |
| 3,655,915 | 4/1972 | Liberman et al. | 370/30 |
| 4,101,833 | 7/1978 | Bingham et al. | 370/30 |

OTHER PUBLICATIONS

"Design and Simulation of a Digital DPSK Modem for 80 kbit/s Full Duplex Data Transmission on the Subscriber Loop" by di Tria et al, Conference: 1981 International Conf. on Communications, Denver, Colorado, U.S.A., June 14-18, 1981.

"A Microprocessor Implementation of a Switched-Network Full-Duplex 2400 BPS Modem" by Kurzweil et al, IEEE 1981 National Telecommunications Conference, Innovative Telecommunications-Key to the Future; New Orleans, La., U.S.A.; Nov. 29-Dec. 3, 1981.

Primary Examiner—Douglas W. Olms
Attorney, Agent, or Firm—Majestic, Gallagher, Parsons & Siebert

[57] ABSTRACT

A 4800 bit-per-second full duplex modem is described which utilizes the full bandwidth of ordinarily available dial-up telephone circuits for transmission of data in both directions in different pass-band portions thereof. The two pass-bands overlap in about the middle of the telephone band in order to fully utilize that bandwidth for high speed data transmission. The overlap is less than that which will cause a greater error rate than desired from remote echos of transmitted data. Local echos, which are much stronger, resulting from the overlap bandwidth portion are cancelled by an echo cancelling technique. Local echo cancelling is accomplished at the baud rate, generated in each modem, for substraction from a received signal; a cancellation signal is generated from a time varying system that depends upon the modulating and demodulating carrier signals.

7 Claims, 5 Drawing Figures

HIGH SPEED DIAL-UP TELEPHONE CIRCUIT FULL DUPLEX DATA TRANSMISSION TECHNIQUES

BACKGROUND OF THE INVENTION

This invention relates generally to digital data transmission techniques wherein dial-up telephone circuits are utilized as the transmission media, and more particularly to an improved modem for accomplishing such transmission.

Transmission of digital data between distant locations by use of dial-up telephone circuits is becoming increasingly popular. The telephone system is used because of the convenience of an existing system interconnecting locations between which data is desired to be transmitted. Because the main purpose of the telephone system is to transmit only voice communications, telephone circuits are very limited in their ability to transmit data. Accordingly, there has been considerable attention directed to making the maximum use of available telephone circuits for data transmission. A principle limitation of telephone circuits for data transmission is their narrow bandwidth, essentially within a range of about 100 Hz to 3200 Hz. Modems have been developed for interconnecting digital equipment to the telephone circuits in a manner to utilize these circuits. Since the rate of digital data that can be transmitted depends upon the telephone circuit bandwidth that can be utilized, modem development has been directed largely toward making better use of the available circuit bandwidths.

The use of common two-wire telephone circuits which transmit signals in both directions at the same time creates problems in full duplex data transmission. Echos of data transmitted at one end of a circuit generally occur and return to be received with the desired data signals at that end. Two components of such undesirable echos are recognized: First, there is an echo from a remote location that is significantly attenuated by the telephone circuit but which is also highly unpredictable because of the time-varying characteristics of trunk telephone carrier circuits. The second is a local echo which occurs in the portion of the telephone circuit at the transmitting location, a local echo being very strong in signal level but generally easier to predict because it has been processed by only linear, time-invariant elements. The goal in dealing with these echos is to reduce the data errors caused by them to a tolerable level. The problem is eliminated if separate telephone circuits (that is, four-wire leased line circuits) are used for independently transmitting data in each direction between two locations, but it is however generally more desirable to be able to use a single dial-up telephone circuit of the type installed anywhere, and so these echo problems must be dealt with. The transmission of data over a single two-wire telephone circuit in only one direction at a time (half duplex operation) also eliminates these problems, but it is generally desired to be able to communicate data simultaneously in both directions (full duplex operation).

A common technique with existing telephone modems is to utilize separate portions of the telephone circuit bandwidth for transmission and reception. In order to avoid the echo problems, these two bandwidths are significantly separated by filters in order to be independent, thus not using a significant portion of the available telephone circuit bandwidth. This results in a significant limitation in the data rate that can be communicated because of the limited bandwidth of the send and receive channels.

The technical literature alternatively suggests utilizing the full bandwidth of the telephone circuit for simultaneous transmission of data in both directions. The undesirable echos that will cause interference between the two channels are suggested to be eliminated by predicting at each modem the echo that will be received by it as a result of the data transmitted from that modem, the predicted echo signal then being subtracted from the received signal to eliminate the effects of the echo. The echo cancellation technique is generally satisfactory to eliminate effects of the local echo, but remote echos are highly unpredictable and extremely difficult to eliminate because they have passed through time-varying elements in the telephone carrier system. As a result, this suggested technique has not been found to be employed in any practical equipment capable of transmitting data with an acceptably low error rate.

Therefore, it is a primary object of the present invention to provide an improved technique of transmitting digital data in full duplex via dial-up telephone circuits with a high speed by an efficient use of the available telephone circuit bandwidth but also with an acceptable low error rate.

It is another object of the present invention to provide a telephone modem of simple construction for accomplishing such data transmission.

SUMMARY OF THE INVENTION

These and additional objects are accomplished by the various aspects of the present invention wherein, briefly, data signals are transmitted in both directions over ordinary dial-up telephone lines in separate bandwidth portions which together fill the entire usable telephone circuit bandwidth to the extent of overlapping each other in about the middle of that bandwidth. The amount of overlap is large enough that signal disturbances caused by the local echo acting alone result in an unacceptably high data error rate, but at the same time the overlap is made small enough that signal disturbances caused by the remote echo acting alone are normally acceptable. The unpredictable remote echo signals are reduced to an acceptable level by a combination of the attenuation of the telephone carrier system and that of the modem band splitting filters. The predictable local echo signals, which would normally be a problem, are substantially eliminated by an echo cancellation technique. The result is a communication system which fully utilizes the limited bandwidth capability of ordinary telephone circuits. Full duplex 4800 bits-per-second data transmission with a very low data error rate is possible using these techniques.

The local echo cancellation is accomplished in each modem by monitoring the data transmitted in one of the two bandwidth portions and forecasting from that, knowing the characteristics of the local echo path, the component of data received in the other bandwidth portion which is caused by such transmission. The forecasted echo signal is then subtracted from the receiver signal. Application of the prior art of echo cancelling to the present problem is complicated by the transmitting and receiving of data on nominally separate frequency bands. The digital signal processing operations involved in modulating the transmitted signal and demodulating the received signal must be carried out at a sampling rate which is several times the baud rate. A prior art echo canceller would also need to operate at this rate resulting in a vary costly implementation. The present invention is superior in that all echo cancellation (including correction for the modulation/demodulation operations) is accomplished at the baud rate. The echo canceller includes a filter having characteristics of the time invariant components of the local path, and, in cascade with it, a time varying component derived from a difference between the two carrier frequencies. The advantage of this technique is its simplicity. Although it is particularly advantageous in the specific data transmission technique described herein, it is also useful with other transmission architectures.

Additional objects, advantages and features of the various aspects of the present invention will become apparent from the following description of a preferred embodiment thereof, which description should be taken in conjunction with the accompanying drawings.

DESCRIPTION OF A PREFERRED EMBODIMENT

Figure 1:
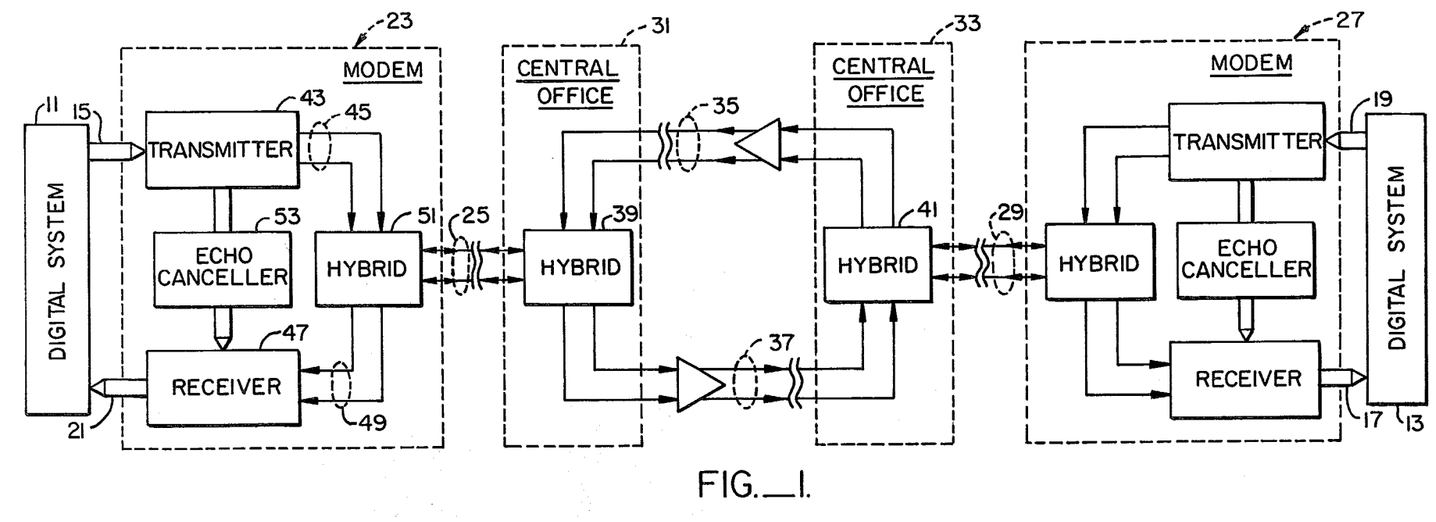
FIG. 1 is a schematic representation of a digital data transmission system that utilizes telephone circuits in accordance with the various aspects of the present invention.

Referring to FIG. 1, a communication system utilizing the various aspects of the present invention will be generally described. The purpose of the system is to provide communication between a digital system 11 at one location, and a second digital system 13 at another location. The digital system 11 presents at an output 15 data to be transmitted to the digital system 13 in circuits 17. Similarly, the system 13 presents data in a circuit 19 to be transmitted to the system 11 at a circuit 21. The digital system 11 includes a modem 23 for interfacing the digital system 11 with a standard two-wire telephone circuit 25. Similarly, at the remote location, the system 13 includes a modem 27 for interfacing it with a two-wire telephone circuit 29.

Typically, the telephone circuits 25 and 29 connect from a subscriber's home or business, where the respective digital system and modem are located, to telephone company central offices 31 and 33. Between central offices, most telephone systems communicate by separate two wire circuits 35 and 37, each carrying signals in only one direction. A hybrid circuit 39 is specifically employed to connect the separate transmission circuits 35 and 37 to the two wire circuit 25 in which communication takes place in both directions at once. Similarly, a hybrid circuit 41 is provided in the central office 33 for connecting the separate circuits 35 and 37 to the single two wire circuit 29. The nature of such telephone circuits is that there is a signal loss in each direction between the communication system end points, from a few decibels up to as much as 35 decibels and perhaps more in some circuits.

The modems 23 and 27 are of similar configuration except that the range of transmitted frequencies of one is the range of the received frequencies of the other. Looking at the modem 23 as being typical, a transmitter 43 receives digital data in the circuits 15 to be transmitted and converts them to voice band signals in a pair of conductors 45. A receiver 47 receives voice band data signals in a pair of conductors 49 and converts those signals to digital data in a circuit 21. A hybrid circuit 51 connects the two conductor pairs 45 and 49 to the single telephone communication two-wire circuit 25. An echo cancelling circuit 53, to be described extensively hereinafter, receives as input data being transmitted in the telephone circuit 25 through the transmitter 43 and develops therefrom a signal that is subtracted from that of the receiver 47 in order to remove any part of the received signal that is due to a transmission from the same end of the communication system.

Figure 2:
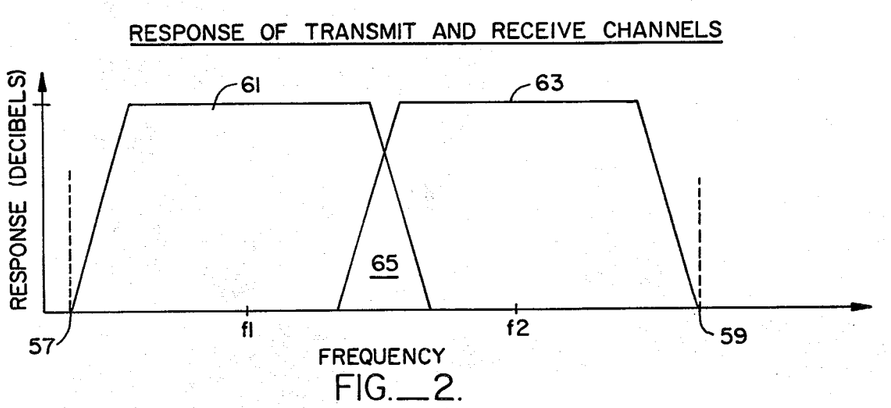
FIG. 2 shows the bandwidth distribution of the transmission system of FIG. 1.

Referring to FIG. 2, an example of transmit and receive bandwidths for the modems 23 and 27 of FIG. 1 will be explained. The maximum usable bandwidth of a typical telephone circuit is shown between a low frequency 57 of about 100 Hz, and a maximum frequency indicated at 59 of approximately 3200 Hz. One portion 61 of this bandwidth carries data signals in the telephone circuit in one direction, while another portion 63 carries such signals in an opposite direction. The bandwidth portions 61 and 63 are shaped by filters which are part of the transmitter 43 and receiver 47. They have sloped sides since practical filters, either in analog or digital form, do not provide abrupt band edges. If the maximum of the curve 61 and 63 is taken to be zero decibels, the base line shown in FIG. 2 is in the neighborhood of minus 60 decibels, for the example to be described.

It will be noticed from FIG. 2, that the transmit and receive bands indicated by the curves 61 and 63 overlap somewhat in about the middle of the telephone bandwidth, and this will now be explained further. Consider, for example, that the transmitter 43 of FIG. 1 operates within the bandwidth portion 63, and its receiver 47 operates within the bandwidth portion 61. In the modem 27 at the opposite end of the communication channel, the transmitter operates within the bandwidth portion 61 and the receiver operates within the bandwidth portion 63. Because of the overlap of the curves 61 and 63, echo effects of telephone circuits must be considered and dealt with. Referring again to FIG. 1, a remote echo path for signals originating in the modem 23 travels from it along the telephone circuits 25 and 37 to the hybrid 41, and back to the modem 23 via the telephone circuit portions 35 and 25. If the telephone circuit between the central offices 31 and 33 includes a carrier system, then its characteristics are subject to severe changes, and there is further a great deal of phase jitter usually present. Remote echo signals originating from the transmitter 43 and returning to the receiver 47 are attenuated significantly because of the nature of telephone circuits. Further attenuation by a filter within the receiver can therefore reduce the remote echo signal strength to a tolerable level. A local echo path extends from the modem 23 to the hybrid 39 and back to the modem 23 over the two-wire circuit 25. The local echo path has only minor attenuation and so the local echo returning to the modem is extremely strong relative to the level of a signal from the remote modem which is heavily attenuated. However, since the local echo path contains no time-varying elements, the local echo signal can be predicted with great accuracy and removed from the received signal by the echo canceller 53.

The way in which the local and remote echos are treated depends upon the rate of errors in the received data that is acceptable. If a large proportion of the data may be erroneous in a particular application, then a high level of the echo signals can remain. In most cases, however, it is desired to keep the data error rate very low, and so the echo signals can be a real problem and must be eliminated or significantly reduced. The overlap of the bandwidth portions 61 and 63, as well as use of an echo cancelling circuit in each of the modems, reduces echo signals to tolerable levels for high quality data transmission and also makes a maximum use of the available telephone circuit bandwidth which has a result of permitting high speed transmission of this data.

The amount of overlap 65 of the curve 61 and 63 is limited by the amount of remote echo that can be tolerated. Since the receiver 47 of the modem 23 accepts all signals within the bandwidth portion 63, for example, a portion of those signals occurring in the overlap portion 65 may result from the transmitter which is sending signals within the bandwidth portion 61. Of course, the receiver of the modem 23 is not interested in this echo signal but only wants to receive what is sent by the transmitter of the opposite modem 27. The overlap portion 65 of the curve 61 and 63 can be maintained at or below a level at which the remote echo will cause the data error rate to exceed a given desired maximum level.

Thus, the remote echo signal can be handled primarily by maintaining the power of such a signal below a level at which it can do any harm. The local echo, because it is much stronger in signal level when reflected back to the modem's receiver, is not so easily eliminated. But its predictability, as discussed above, allows it to be processed out of the received signal, as discussed below.

Digital data handled by each of the systems 11 and 13 is carried in a base-band signal. This signal is translated from that base-band into one of the pass-bands 61 or 63 by use of a carrier frequency f1 and f2, respectively, in the modems. The frequency f1 is the center frequency of the band 61 and the frequency f2 is the center frequency of the bandwidth 63. In a particular example, these center bandwidths are 975 Hz and 2325 Hz, respectively. In this example, the 3-dB point bandwidth of each of the curves 61 and 63 is 1200 Hz. The width of each transition region from the 3-dB point response to a level 60 decibels below that level is 300 Hz. The slope in this region is made to be as steep as possible with tolerable complexity in hardware and software.

Figure 3:
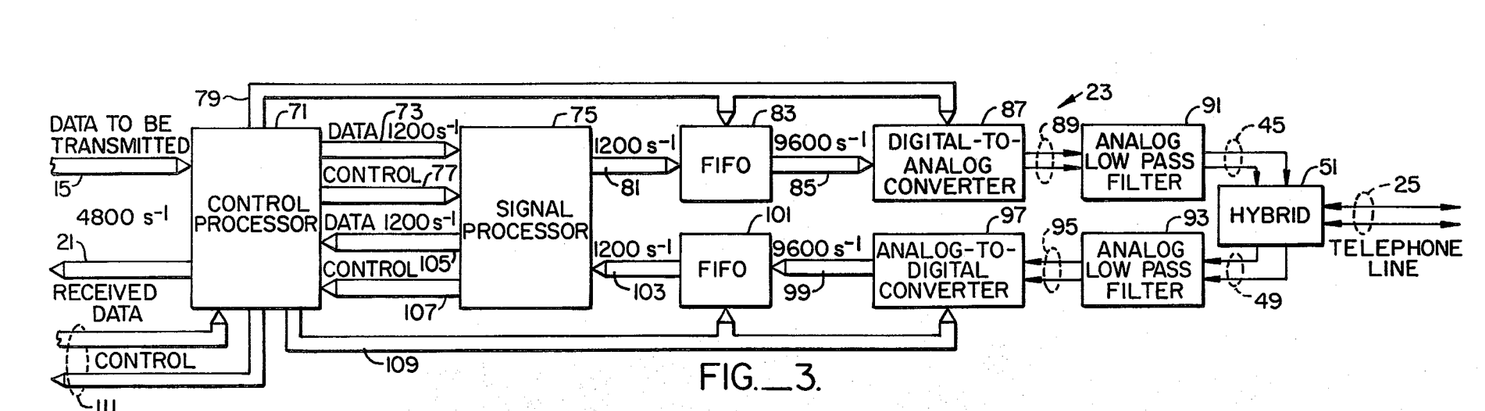
FIG. 3 is a block diagram showing one embodiment of a modem in the communication system of FIG. 1.

There are many ways in which such a modem may be constructed, both in hardware and software. Software implementation of a significant portion of the modem is preferred. A system which allows such an implementation is shown in FIG. 3. Although the transmit and receive channels have common processing elements, they may still be considered as separate, for the purposes of this description.

Referring initially to the transmit path, serial digital data are received in a circuit 15 from a computer or other digital system for transmission to a remote location. The data are applied to a control processor 71 which executes a software program to perform the operations of scrambling (to "whiten" the data) gray encoding and differential encoding of the data. These operations as well as their purposes and techniques for performing them are well known. The serial data input to the control processor 71 in the line 15 is at a rate of 4800 bits-per-second (written another way as 4800 s$^{-1}$). Circuit 73 carries binary data in parallel groups of four bits (each group called a quadbit) to a signal processor 75. This quadbit data transfer is in synchronism with a baud clock at the rate of 1200 s$^{-1}$. Appropriate control signals are also passed from the control processor 71 to the signal processor 75 through circuit 77. Additional control circuits 79 communicate control signals from the processor 71 to later elements.

The signal processor 75, through its hardware and controlling software, responds to a quadbit data input in the circuit 73 by generating digital signals in an output circuit 81 in a manner to be described below in greater detail with respect to FIG. 4. These signals, which correspond exactly to analog signals to be delivered to a telephone channel for transmission to a distant modem, take the form of digital samples which are delivered asynchronously in bursts of eight to the input of a first-in-first-out (FIFO) shift register 83. These bursts are delivered once per baud (at a rate of 1200 s$^{-1}$) so that the average rate at which output samples are generated by the signal processor 75 in circuits 81 is 9600 s$^{-1}$.

An output of the shift register 83 in circuits 85 is strobed to a digital-to-analog converter 87 at a uniform rate of 9600 s$^{-1}$ in 8:1 synchronism with a 1200 s$^{-1}$ baud rate clock (not shown). An output in circuits 89 of the digital-to-analog converter 87 is in the form of pulse-amplitude-modulated (PAM) pulses which each have a duration of 1/9600 second. These pulses are applied to an analog low-pass filter and amplifier 91 which has a cut off frequency near 3400 Hz in order to reduce high frequency spectral components of the transmitted signal to a level below that specified by the telephone company. An output of the filter and amplifier 91 is connected to the circuit 45 and thence to the hybrid circuit 51, as previously described with respect to FIG. 1. The purpose of the hybrid 51 is to prevent excessive amounts of transmitted signal power from entering the input of the modem receiver unit which, of course, shares the telephone circuit 25 with the transmitter.

The receiver circuit of the modem of FIG. 3 will now be described. The received signal path 49 from the hybrid circuit 51 is applied to an analog low pass filter 93. The filter 93 is nominally identical to the transmitter low-pass filter 91, and has a similar purpose to reduce the out-of-band noise to the lowest practical level before sampling the incoming signal and converting it to digital form. This procedure conforms to well established practices in digital signal processing. The signal input to the filter 93 is a combination of the desired signal transmitted from a remote modem, along with interfering signals. These interfering signals include at least noise, inter-symbol interference, carrier phase jitter contributed by the telephone channel, and both local and remote echo signals. These echo signals, described previously, appear at the input to the filter 93 in response to the signal output of the transmitter portion of the modem 23 previously described. These echos are caused by the inevitably non-ideal hybrid circuits which are used as part of the modem and at several places in the telephone circuit between distant modems. The local echo may have a ratio of power to a signal received from the remote modem in the vicinity of 35 decibels because the remotely transmitted signal may be strongly attenuated by the telephone circuit while the local echo generated as a result of local transmission is not so attenuated. Thus, as previously discussed, this local echo within the received signal band must be cancelled, a method of which is described below with respect to FIG. 4.

An output of the filter 93 of FIG. 3, in a circuit 95, is applied to an analog-to-digital converter (ADC) 97 whose output in circuits 99 is a series of digital samples. The ADC 97 samples the analog signal in the circuit 95 at a 9600 s$^{-1}$ rate in 8:1 synchronism with the baud clock. The ADC 97 should have at least twelve bit resolution in order to accommodate the large dynamic range occupied by the very large echo signal level and the very small desired signal from the remote modem. The digital signal samples in the circuits 99 are then strobed into the input of a FIFO register 101 which is similar to the register 83. These samples are transferred from the FIFO register 101 through circuits 103 to the signal processor 75 once per baud in groups of eight. The rate of transfer of these groups is then 1200 s$^{-1}$.

The signal processor 75 operates upon these samples in a manner described below with respect to FIG. 4, and passes output information through circuits 105 to the control processor 71. This output information is in the form of quadbits in synchronism with the baud clock. The control processor 71 performs differential decoding, gray decoding and descrambling operations on the data, effectively cancelling the effect of corresponding operations already performed at the remote modem transmitter. Control circuits 107 also couple the signal processor 75 to the control processor 71. Control circuits 109 extend between the control processor 71 and other hardware elements of the receiver. Control circuits 111 connect to the control system of the computer or other digital system with which the modem is communicating. The data received from the remote end is serially transmitted in binary form in circuit 21 to the computer or other digital utilizing system at a rate of 4800 s$^{-1}$.

The primary functions of the modem of FIG. 3 to be described are in the signal processor 75. This, of course, could be a hard wired device, but it is preferred to utilize a software controlled microprocessor. FIG. 4 shows, in schematic block diagram form, the preferred software processing of signals in both the transmitter and receiver as are accomplished by the signal processor 75. This processing within the signal processor 75 need not necessarily be done in any particular order, nor is it necessary to maintain any time synchronism within the signal processor itself so long as baud synchronism is maintained between the signal processor 75 and the control processor 71, and with the interfaces of the signal processor 75 and the FIFO registers 83 and 101. Nevertheless, average transfer rates within the signal processor 75 are illuminating and these are the rates that are shown on the processing diagram of FIG. 4. In this explanation, "k" is an integer which is incremented at a rate of 1200 s$^{-1}$ and may therefore be considered to be a baud time index, while "n" is an integer which is incremented at a rate of 9600 s$^1$ (8 times per baud) and which may therefore be considered to be a sample timing index.

Quadbits in input circuits 73 form the input to a data-to-signal conversion table 121. An output 123 of the table 121 is one of 16 unique complex numbers which forms the input to the software transmitter. The complex transmitter input at the k-th baud time is called a(k). The program for computing the transmitter input is given in the readinput PROCedure in an Appendix hereto. In order to be able to translate the data signal frequency into one of the desired bandwith portions 61 or 63, seven zero signal values are inserted between each complex input sample at 125. This combination in 127 is then digitally low-pass filtered at 129. Elements 125 and 129 comprise an interpolating low-pass filter which has a frequency response corresponding to the square root of a Nyquist raised-cosine low-pass filter with a half-amplitude response frequency of 600 Hz and a roll-off parameter of 50%. The function of the element 125 is expressed mathematically as $$b(n) = a(k), \text{ if } n = 8k \quad \text{(Eq 1)}$$
$$= 0, \text{ otherwise}$$

where the interpretations to be applied to k and n are given above. If the coefficients of the digital low-pass filter 129 are denoted by dlpf(m) for m=0,1, ... , 63, then filter output, c(n), is defined by $$c(n) = \sum_{m=0}^{63} dlpf(m)b(n - m) \quad \text{(Eq 2)}$$

Economies are available in the implementation of Eq2 because only $\frac{1}{8}$ of the {b(n)} values which occupy the filter memory are non-zero. The software algorithm for implementing processing steps indicated at 125 and 129, which is given in the Appendix as the transmit PROCedure, takes advantage of this fact.

The transmitter low-pass filter output 131, c(n), is applied to the input of a complex modulator. Another input 137 is exp(j2π(txfrq)n/512), a carrier signal. The modulator output is d(n), a signal with spectrum centered about a carrier frequency of (txfrq)(9600)/512 Hz. In this example, txfrq=124 so that the carrier frequency is (124)(9600)/512=2325 Hz, f2 of FIG. 2. The imaginary part of d(n) at 135 is discarded in 139, and the result is stored in an 8-element buffer 143, called outdt. The outdt buffer 143 is cleared once per baud by writing its contents to the FIFO 83. The average rate of this transfer 9600 s$^{-1}$. The mod PROCedure in the Appendix gives the software implementation of steps 133 and 139 whereby modulated data samples are computed and stored in the outdt buffer 143. Transfer of data from the outdt buffer 143 to the FIFO 83 over circuit 81 is accomplished in the synchronize PROCedure in the Appendix.

On the receiver side of the modem, real data from the FIFO 101 are transferred (by means of the synchonize PROCedure in the Appendix) to an 8-element buffer 145 called indat at an average rate of 9600 s$^{-1}$. The samples from this buffer are fed one at a time into a complex demodulator 149, another input 153 of which is exp(−j2π(rxfrq)n/512). In this example, rxfrq=52 so that the carrier frequency is (52)(9600)/512=975 Hz, f1 of FIG. 2. (See the demod PROCedure in the Appendix for the corresponding software.) The demodulator output 151, e(n), a complex-valued signal, is then low-pass filtered with a digital finite impulse response (FIR) low-pass filter 155 which has coefficients identical to those used in the transmitter filter 129. (See the receive PROCedure in the Appendix.) The result may be expressed mathematically in the time domain as $$f(n) = \sum_{m=0}^{63} dlpf(m)e(n-m). \quad \text{(Eq 3)}$$

This filtering operation serves the function of reducing the far end echo signal to a tolerable level (about 30 dB below that of the desired signal) and also limits the output signal from the filter to the Nyquist bandwidth of 600 Hz so that further processing in the receiver may be carried out at 1200 s$^{-1}$. Whereas Eq3 suggests that the filter output is computed eight times per baud, only one sample of the filter output per baud is needed for later processing steps. Therefore, only one filter output per baud actually need be computed, and one sample is selected at 159 out of every eight samples presented at 157. The baud-rate filter output at 161 is given by $$w(k) = f(8k + \text{time}) \quad \text{(Eq4)}$$

where time is an integer satisfying $1 < \text{time} < 8$. The value of time is selected during the modem training procedure.

The signal w(k) contains both the desired signal from the remote modem and a significant component of the local echo. A replica 165 of the local echo called v(k) is therefore subtracted from w(k) in 163 to obtain x(k) in 167, the net received signal which is used in further signal processing steps in the modem receiver. The local echo replica, v(k), is generated in the echo canceller 53 from the input signal at 123, a(k), as will now be described.

The signal at 123, a(k), is filtered by linear, time-invariant part 175 of the echo canceller 53 having filter coefficients denoted as {eccoef(m); M=0,1, ..., 35}. The corresponding mathematical expression for the signal at 177 is $$u(k) = \sum_{m=0}^{35} eccoef(m)a(k-m) \quad \text{(Eq 5)}$$

The filter function 175 is set to be equal to the linear, time-invariant part of the telephone and modem circuits between locations 123, out to the telephone system hybrid 39 (FIG. 1), and back to location 161 (FIG. 4) of the modem 23 processing. The determination of the eccoef coefficients is made during a training procedure which is described below. This filter function is preferably updated on a periodic basis to allow for any changes in this local echo path that may take place over time.

The u(k) signal at 177, must be further processed to compensate for the modulation/demodulation operations 133 and 149 which exist in the local echo path. This is because the modulation/demodulation functions of the modem introduce a time varying component that cannot be represented by the time-invariant filter function 175. This processing takes place in 179 and 183 and can be described as $$v(k) = u(k)*\exp(j2\pi(txfrq)(8k+\text{time})/512) \quad \text{(Eq 6)}$$
$$*\exp(-j2\pi(rxfrq)(8k+\text{time})/512)$$

where an asterisk is used to denote multiplication. Complex modulation steps 179 and 183 constitute a time-varying component of the echo canceller that is controlled by the difference in the modulating frequencies txfrq (proportional to f2) and rxfrq (proportional to f1), through steps 181 and 185. Existing suggestions of echo cancelling techniques do not introduce such a time varying function Indeed, it seems at first not to be possible or desirable to develop and apply a cancellation signal at the baud rate because the modulation/demodulation operations required are normally carried out at the sample rate, not the baud rate. It can be shown that the required echo canceller outputs at baud times can be computed using only baud-rate filtering and modulation/demodulation signals. Existing procedures suggest doing echo cancelling on the telephone circuit side of the modulation/demodulation functions, either in digital or analog portions of the modem. However, it has been found preferable to implement the present echo canceller at the baud rate, as shown, because of a less complex and faster processing time. The ecancel PROcedure in the Appendix gives the software description of the steps corresponding to Eq5 and Eq6, including the setting of the {eccoef} coefficients of the filter 175.

The remainder of the processing steps 169 in the modem consist of algorithms for adaptive equalization to reduce intersymbol interference, for tracking changes in carrier phase and baud timing, and for assigning the processed signal 171 received in each baud interval, y(k), to one of 16 possible received complex values. Finally, one of 16 combinations of 4 data bits is selected at 173 based upon y(k) and these 4 bits are passed to the control processor. The writeoutput PROcedure in the Appendix summarizes the software for these processing steps.

Figure 4:
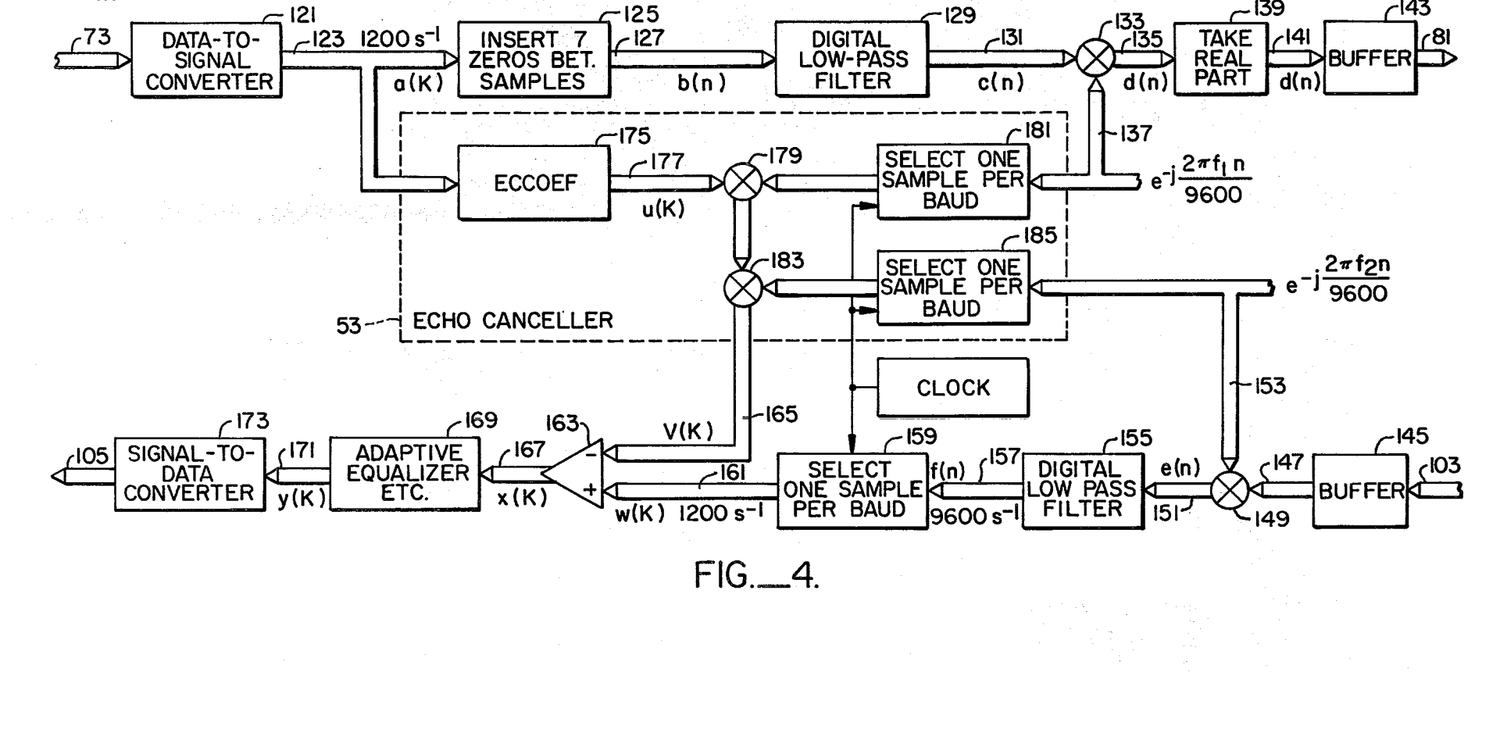
FIG. 4 is a software block diagram showing major processing functions of the modem of FIG. 3.
Figure 5:
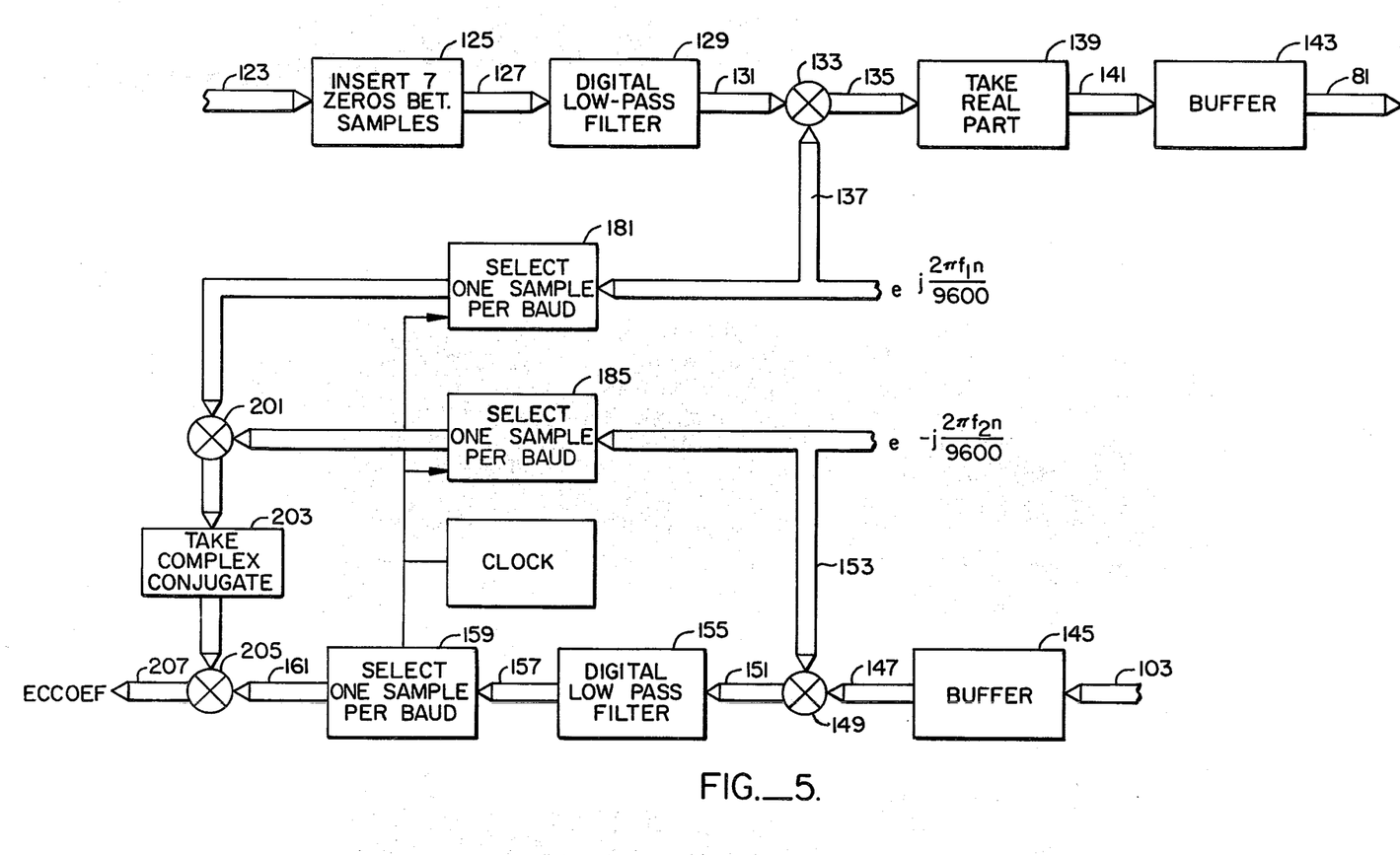
FIG. 5 is a variation of the FIG. 4 software block diagram to show training of the echo canceller.

Before the modem is operated in the data mode it is necessary to execute a training procedure during which the echo canceller filter coefficients are learned for the first time. To execute this procedure, it is necessary, by some means to place the remote modem into a quiescent state so that the only signals observed at the input of the local modem are channel noise and signals which originate locally. With the modem in this state, with time already selected, and with all filter memory arrays set to zero, a single unit-sample, δ(k) is injected at 123 into the transmitter input, as shown in FIG. 5. The baud time at which the unit-sample is applied defines k=0. The modem is operated for k=0, 1, ..., 35 as shown in FIG. 5 as described in the trainingmode PROCedure in the Appendix. That is, all processing steps are performed which carry the transmitted signal around the echo path up to the point where w(k) is selected at the output 161 of the receiver digital low-pass filter 155, 159. Simultaneously, the transmitter and receiver carrier signals are sampled at the instants $$n = 8k + \text{time} \quad \text{(Eq7)}$$

for k=0, 1, ..., 35, the signals are multiplied in a mixer 201, and the complex conjugate of the result is computed by changing the sign of the imaginary part in 203. The resulting signal is exp(J2π(rxfrq−txfrq)(8k+time)/512). Then the k-th complex echo canceller coefficient is computed as $$eccoef(k) = w(k)*\exp(j2\pi(rxfrq-txfrq) (8k+\text{time})512 \quad \text{(Eq8)}$$

for k=0, 1, ... 35, and the resulting 36 complex coefficients become the echo canceller coefficients "eccoef" used in the data mode in the echo canceller portion 175 of FIG. 4.

During data mode operation the modem continues to adjust the coefficients of the echo canceller in order to track any slow changes which may occur in the local echo path during a long session of transmitting and receiving data. Because the echo canceller coefficients are learned before the data mode begins, the updating algorithm need only have the capability of responding to slow changes in the echo path, and so the least mean-square (LMS) algorithm, which is well-known to practioners of the art of modem design, may be used to update the coefficients. The time-varying nature of the echo canceller used in the present invention, however, requires that the basic LMS alorithm be modified accordingly. The four elements involved in the LMS algorithm are the error signal, x(k), the data, a(k), the coefficients being updated, {eccoef(k); k=0, 1, ..., 35}, and an updating parameter, $\Delta$, usually a small positive number. In the present case the basic error signal, x(k), must be reflected through the time-varying elements of the echo canceller with the result that a modified error signal, x'(k), is derived. That is, x'(k) is given by $$x'(k) = x(k)*\exp(j2\pi(rxfrq)(8k + time)/512) \quad \text{(Eq 9)}$$
$$*\exp(-j2\pi(txfrq)(8k + time)/512).$$

With this accomplished, the updating algorithm takes the following form:

Let $eccoef(k; m)$ be the value of the $m$-th echo canceller coefficient after $k$ bauds have been transmitted. Then $eccoef(k + 1; m)$ is given by
$eccoef(k + 1; m) = eccoef(k; m) - \Delta x'(k)a^*(k - m)$
for $m = 0, 1, \ldots, 35$. (Eq 10)

Because the error signal, x'(k) in circuits 167 (FIG. 4), is influenced by many signals (notably the remotely generated data signal itself) in addition to the residual echo signal, the parameter $\Delta$ should be chosen to be very small so that updating occurs very slowly and is therefore influenced chiefly by what happens during the long term in the echo path. The procedure outlined here is presented in software from in the ecupdate PROCedure in the Appendix.

Although the various aspects of the present invention have been described in the environment of a preferred embodiment of a modem and data transmitting system, it will be understood that the invention is entitled to protection within the full scope of the appended claims.

APPENDIX

SOFTWARE DESCRIPTION OF THE INVENTION

The language used to describe the software implementation of the invention borrows its notation from the process design language (PDL) described by Linger, Mills, and Witt (Ref. 1). The features of this notation are summarized below.

The basic program element in PDL is the procedure. The beginning and end of a procedure are delineated by the keywords PROC and CORP (PROC spelled backwards), respectively. Procedures are identified by name and the construction

```
PROC procname
    .
    .
    .
CORP
``` is used to describe a procedure named procname. Procedures are invoked by the keyword RUN. For example,

```
RUN procname
``` causes the procedure named procname to be executed.

All data used in the description is global in nature so that any procedure can access any data location at any time. Therefore, although procedures may be used to serve the same function as served by subroutines in other languages, dummy names for data are not used in this description.

Program statements within a procedure are executed sequentially unless otherwise indicated by keywords to be defined later. Thus the procedure

```
PROC threelines
    (statement 1)
    (statement 2)
    (statement 3)
CORP
``` will cause the three statements indicated to be executed in natural order. When several identical statements are to be executed in sequence with different data for each one, the notation FOR-DO-OD (DO spelled backwards) may be used. The following example illustrates how this technique may be used to clear locations 1,2,...,10 of memory.

```
FOR
   i:∈(1,10) by 1
DO
   (clear i-th memory location)
DO
```

The sequential order of execution of statements in a procedure may be altered in several ways. The first is by means of the IF-THEN-ELSE-FI (IF spelled backwards) set of keywords. To illustrate, the construction

```
IF
   (iftest)
THEN
   (thenpart)
ELSE
   (elsepart)
FI
``` is executed as follows. First the condition (iftest) is tested. If the condition is true, then the section (thenpart) is executed and the section (elsepart) is not executed. If the condition is false, then the section (elsepart) is executed and the section (thenpart) is not executed. In any case, execution resumes with the first statement which follows the keyword FI. The IF-THEN-ELSE-FI construction can be used to define the simpler IF-THEN-FI construction in which the ELSE section is null and therefore not included.

Two keyword constructions which are used in this description remain to be defined. These are the WHILEDO (WHILE-DO-OD) and the DOUNTIL (DO-OD-UNTIL) constructions. The WHILEDO is used as follows:

```
WHILE
   (whiletest)
DO
   (dopart)
OD
```

Here the condition (whiletest) is evaluated. If the condition is true, then the section (dopart) is executed and the (whiletest) condition is evaluated again. The section (dopart) will be executed after each test as long as the (whiletest) condition is true. Whenever the condition becomes false the statement following the OD is executed. The DOUNTIL used as follows:

```
DO
   (dopart)
UNTIL
   (untiltest)
OD
```

Here the section (dopart) is executed once and then the (untiltest) condition is evaluated. If the condition is true, then the section (dopart) is repeated. If the condition is false, then the first statement following OD is executed. Note that the WHILEDO and the DOUNTIL constructions differ mainly in that in the WHILEDO the test condition is evaluated first while in the DOUNTIL the DO section is executed once and then the UNTIL test is evaluated. Therefore the DO-OD section of the DOUNTIL is always executed at least once whereas the DO-OD section of the WHILEDO will not be executed at all if the test is initially false.

Comments in the description are enclosed in square brackets.
For example,

[This is a comment.]

The operators used in the description mostly follow usage which is common in mathematics. Three exceptions are the ':=', '=', and '≠' symbols. The ':=' is used in assignment statements. For example, r1:=5 is used to assign the numerical value 5 to the variable r1. The '=' and '≠' symbols are used only in logical tests. The '=' symbol is a test for equality or equivalence and the '≠' symbol means 'is not equal to'. The asterisk is used to denote multiplication.

The software description is orgaanized around the following main program. The various PROCedures which make up the main program are listed on later pages. For convenience, the page number on which each PROCedure is found is given as a comment whenever that PROCedure is RUN. All variable names used in the description are defined in the DATA-ATAD section beginning on page A-13.

```
PROC main

RUN synchronize [See page A-5.]

IF
     state=datamode
  THEN

RUN datamode [See page A-6.]

ELSE

RUN trainingmode [See page A-6.]

FI
CORP

PROC synchronize [IN: clock; OUT: state,txsgpt,rxsgpt,txcnt,txphz,rxphz,
                 txsg(72),rxsg(128)]
  IF
     (first entry)
  THEN
     state:=trainother
     txsgpt:=txsg
     rxsgpt:=rxsg
     txcnt:=0
     txphz:=0
     rxphz:=0
     FOR
        i:∈(0,71) by 1
     DO
        mem(txsg+i):=0.0
     OD
     FOR
        i:∈(0,127) by 1
     DO
        mem(rxsg+i):=0.0
     OD
     (Reset clock and start clock running.)
  FI
  WHILE
     (clock has not run to 1/1200 second)
  DO
     (nothing.)
```

```
   OD
   FOR
   i:∈(1,8) by 1
   DO
      (Transfer mem(outdat+i) to D/A fifo.)
      (Transfer sample from A/D fifo to mem(indat+i).)
   OD
   (Reset clock and start clock running.)
CORP PROC trainingmode
   IF
      state=trainother
   THEN
      (Train other stages of the modem. Select timing
        (ie. set time to a non-zero value). When finished,
        cause remote transmitter to transmit zero for duration of
        echo canceller training procedure and set state:=trainec.)
   ELSE [Train echo canceller.]

RUN unitsample [See page A-11.]

RUN transmit [See page A-11.]

RUN receive [See page A-10.]

RUN ecmeasure [See page A-8.]

FI
CORP

PROC datamode

RUN readinput [See page A-9.]

RUN transmit [See page A-11.]

RUN receive [See page A-10.]

RUN ecancel [See page A-7.]

RUN ecupdate [See page A-8.]

RUN writeoutput [See page A-12.]

CORP

PROC cfilt [IN: r2,r9,r13,r14,r15; OUT: r11,r12]
   xo:=0.0
   r0:=r15+r9
   r1:=r14+r2
   lc:=r13+r9

RUN mult [See page A-9.]

r0:=r15
   r1:=r14
   lc:=r13

RUN mult [See page A-9.]

r12:=xo
   xo:=0.0
   r0:=r15
   r1:=r14+r2
```

```
RUN mult [See page A-9.]

r0:=r15+r9
r1:=r14
lc:=r13+r9

RUN mult [See page A-9.]

r11:=xo
CORP

PROC demod [IN: r4,r5,rxphz,indat(8); OUT: rxsgst(128)]
  rxphz:=rxphz-rxfrq (mod 512)
  mem(r15):=mem(r4)*mem(cos+rxphz)
  mem(r15+64):=mem(r4)*mem(sin+rxphz)
CORP PROC ecancel [IN: txsg(72),lpoutr,lpoutx; OUT: r11,r12]
  r2:=36
  r6:=-txphzt-rxphzt (mod 512)
  r9:=36
  r13:=txsgfn
  r14:=eccoef
  r15:=txsgpt RUN cfilt [See page A-7.]

RUN phsh [See page A-9.]

r12:=r12-r4
  r11:=r11-r3
CORP

PROC ecmeasure [IN: rxphzt,txphzt,lpoutr,lpoutx,txcnt; OUT: txcnt,
                    eccoef(72),state]
  r6:=txphzt+rxphzt (mod 512)
  r11:=lpoutx
  r12:=lpoutr RUN phsh [See page A-9.]

mem(eccoef+txcnt):=r4
  mem(eccoef+txcnt+36):=r3
  txcnt:=txcnt+1
  IF
    txcnt=36
  THEN
    state:=data
  FI
CORP PROC ecupdate [IN: txphzt,rxphzt,eccoef(72),txsg(72); OUT: eccoef(72)]
  r1:=txsgpt-1
  r2:=eccoef-1
  r6:=txphzt+rxphzt (mod 512)
  cnt:=35

RUN phsh [See page A-9.]

WHILE
    cnt>-1
  DO
    r1:=r1+1
    IF
```

```
         r1>36
      THEN
         r1:=r1-36
      FI
      r2:=r2+1
      mem(r2):=mem(r2)+r3*mem(r1+36)+r4*mem(r1)
      mem(r2+36):=mem(r2+36)+r3*mem(r1)+r4*mem(r1+36)
   OD
CORP PROC mod [IN: txphz,r4,r11,r12; OUT: outdt(8)]
   txphz:=txphz+txfrq (mod 512)
   mem(r4):=r12*mem(cos+txphz)-r11*mem(sin+txphz)
CORP PROC mult [IN: r0,r1,r2,r9,lc,xo; OUT: xo]
   cnt:=r2-1
   xx:=mem(r0)
   r0:=r0+1
   WHILE
      cnt>-1
   DO
      xy:=mem(r1)
      r1:=r1+1
      IF
         r0>lc
      THEN
         r0:=r0-r9
      FI
      xo:=xx*xy+xo
      xx:=mem(r0)
      r0:=r0+1
      cnt:=cnt-1
   OD
CORP PROC phsh [IN: r6,r11,r12; OUT: r3,r4]
   r3:=r11*mem(cos+r6)-r12*mem(sin+r6)
   r4:=r12*mem(cos+r6)+r11*mem(sin+r6)
CORP PROC readinput (OUT: r0,r1)
   (Acquire 4 data bits from the DTE.
    Perform appropriate scrambling and coding operations on these and
    previously acquired bits to obtain 4 bits of data to be transmitted.
    Assign to these four bits one of 16 unique complex numbers.  Place
    the real part of the complex number into r0; place the imaginary
    part of the complex number into r1.)
CORP PROC rfilt [IN: r2,r9,r13,r14,r15; OUT: r11,r12]
   xo:=0.0
   r0:=r15
   r1:=r14
   lc:=r13

RUN mult [See page A-9.]

r12:=xo
   xo:=0.0
   r0:=r0+r9
   r1:=r14
   lc:=r13+r9

RUN mult [See page A-9.]

r11:=xo
CORP
```

```
PROC receive [IN: indat(8),rxphz,time,rxsg(128); OUT: lpoutr,lpoutx,
              rxphzt,rxsg(128)]
   r2:=64
   r4:=indat
   r9:=64
   r10:=8
   r13:=rxsgfn
   r14:=dlpf
   r15:=rxsgpt
   DO
      r4:=r4+1

RUN demod [See page A-7.]

IF
         r10=time
      THEN

RUN rfilt [See page A-9.]

rxphzt:=rxphz
         lpoutr:=r12
         lpoutx:=r11
      FI
      r15:=r15-1
      IF
         r15<rxsg
      THEN
         r15:=r15+64
      FI
      r10:=r10-1
   UNTIL
      r10=0
   OD
   rxsgpt:=r15
CORP PROC transmit [IN: r0,r1,txphz,time,txsg(72); OUT: outdt(8),txphz,
               txphzt,txsg(72)]
   r2:=8
   r4:=outdt
   r9:=36
   r10:=8
   r13:=txsgfn
   r14:=dlpf
   r15:=txsgpt-1
   IF
      r15<txsg
   THEN
      r15:=r15+36
   FI
   txsgpt:=r15
   mem(r15):=r0
   mem(r15+36):=r1
   DO RUN rfilt [See page A-9.]

r4:=r4+1

RUN mod [See page A-8.]

r14:=r14+16
      IF
         r10:=time
      THEN
         txphzt:=txphz
```

```
      FI
      r10:=r10-1
   UNTIL
      r10=0
   OD
CORP

PROC unitsample [IN: txcnt; OUT: r0,r1]
   IF
      txcnt=0
   THEN
      r0:=1.0
      r1:=0.0
   ELSE
      r0:=0.0
      r1:=0.0
   FI
CORP PROC writeoutput [IN: r11,r12]
   (Consider r12 to be the real part and r11 to be the imaginary part
   of a complex input to the remainder of a receiver system which
   performs adaptive equalization, carrier tracking, decoding, and
   descrambling in order to recover 4 data bits as transmitted by a
   remote DTE.  Pass these 4 data bits to the DTE.)
CORP
```

| DATA | [This section defines all data used in the above description.] |
|---|---|
| cnt | [Loop counter.] |
| datamode | [When state=datamode the modem operates by passing data to and accepting data from the DTE and by transmitting and receiving signals from from the telephone channel.] |
| cos | [Start address for cosine table.  Table contains 512 entries organized such that mem(cos+i)=cos(2*i/512) for i=0,1,...,511.] |
| delta | [Updating gain for echo canceller coefficients.] |
| dlpf | [Start address for array of digital low-pass filter coefficients used in both transmitter and receiver. The i-th filter coefficient is located at mem(dlpf+i) for i=0,1,...,63.] |
| eccoef | [Start address for echo cancelle. coefficient array. The real part of the i-th coefficient is stored at mem(eccoef+i); the imaginary part of the i-th coefficient is stored at mem(eccoef+36+i) for i=0,1,...,35.] |
| indat | [Address of input data from A/D.  Eight inputs from A/D are stored at mem(indat+i) for i=1,2,...,8.] |
| indat(8) | [This notation is used to refer to the entire array of data which are addressed by indat.] |
| lc | [Comparison value (lc means load comparator).] |
| lpoutr | [Real part of receiver low-pass filter output.] |
| lpoutx | [Imag part of receiver low-pass filter output.] |

| | |
|---|---|
| mem | [Refers to data memory (either ROM or RAM). Data stored at address i in memory is denoted by mem(i).] |
| outdt | [Address of array of output data to be passed to D/A. Eight array values are stored at mem(outdt+i) for i=1,2,...,8.] |
| outdt(8) | [This notation is used to refer to the entire array addressed by outdt.] |
| rk | [For k=0,1,...,15, rk is one of a set of 16 registers used by the processor as working memory. The registers are used to pass data and addresses to and from subroutines (PROCs).] |
| rxfrq | [Integer phase increment corresponding to a receiver carrier frequency of 2325 Hz based upon a sine/cosine ROM table with 512 entries. That is, rxfrq=(512)(2325)/9600.] |
| rxphz | [Accumulated value of receiver carrier phase angle expressed as an integer mod 512. The corresponding angle is rxphz*2$\pi$/512 radians.] |
| rxphzt | [Value of rxphz at instant corresponding to time.] |
| rxsg | [Start address of receiver low-pass filter data memory. The real part of the i-th entry is located at mem(rxsg+i); the imaginary part of the i-th entry is located at mem(rxsg+64+i) for i=0,1,...,63.] |
| rxsg(128) | [This refers to the entire array addressed by rxsg.] |
| rxsgfn | [Address of last (final) member of receiver low-pass filter memory array. (rxsgfn=rxsg+64)] |
| rxsgpt | [Receiver signal pointer: pointer for memory of receiver low-pass filter. The real part of demodulated data are stored at mem(rxsgpt); the imaginary part of demodulated data are stored at mem(rxsgpt+64.] |
| sin | [Start address for sine table. Table contains 512 entries organized such that mem(sin+i)=sin(2$\pi$*i/512) for i=0,1,...,511.] |
| state | [This variable is used to keep track of the state of the modem. The possible states are trainother, trainec, and datamode.] |
| time | [An integer belonging to {0,1,...,8} which corresponds to one of eight samples available during each baud interval at the output of the receiver low-pass filter. After time has been selected during the training procedure then only the filter output corresponding to time need be calculated.] |
| trainec | [When state=trainec, then the procedure for training the echo canceller is executed.] |
| trainother | [When state=trainother, then the procedure is executed which trains parts of the modem other than the echo canceller.] |
| txfrq | [Integer phase increment corresponding to a transmitter carrier frequency of 975 Hz based upon a sine/cosine ROM table with 512 entries. That is, txfrq=(512)(975)/9600.] |

| | |
|---|---|
| txphz | [Accumulated value of transmitter carrier phase angle expressed as an integer mod 512. The corresponding angle is txphz*2π/512 radians.] |
| txphzt | [Value of txphz at instant dicated by time.] |
| txsg | [Start address of transmitter low-pass filter data memory. The real part of the i-th entry is located at mem(txsg+i); the imaginary part of the i-th entry is located at mem(txsg+36+i) for i=0,1, ...,36. The data addressed by txsg are also used as data for the echo canceller filter.] |
| txsg(72) | [This refers to the entire array addressed by txsg.] |
| txsgfn | [Address of the last element of the real part of the txsg(72) array (txsgfn=txsg+35).] |
| txsgpt | [Transmitter signal pointer: pointer which locates elements of txsg(72) array.] |
| xo | [Multiplier output.] |
| xx | [Multiplier input.] |
| xy | [Multiplier input.] |
| ATAD | |

REFERENCES

1. R.C. Linger, H. D. Mills, and B.I. Witt, *Structured Programming: Theory and Practice*, Reading, Mass.: Addison-Wesley, 1979.

It is claimed:

1. A telephone modem capable of simultaneously transmitting and receiving data signals with less than a given error rate over a common dial-up telephone circuit of a given usable bandwidth, comprising:
    means converting digital data into analog signals for transmitting said analog signals through said telephone circuit in a first portion of its said usable bandwidth,
    means receiving analog signals from said telephone circuit for converting those signals within a second portion of said usable bandwidth into digital data, said first and second bandwidth portions each being a different substantially one-half of said telephone circuit bandwidth and arranged to occupy substantially the entire telephone circuit bandwidth, said first and second bandwidth portions overlapping in frequency passband in about the middle of said useable bandwidth and in an amount that local signal echo would normally result in an error rate in excess of said given error rate but remote signal echo would normally result in an error rate less than said given error rate, and
    means connected between said transmitting and receiving means for subtracting from a received signal any portion of a transmitted signal within the overlapping portion of said first and second bandwidth portions, thereby to suppress the local echo and reduce the error rate from echos to something less than said given rate,
    whereby utilization of the given telephone circuit bandwidth for rapid data communication is maximized.

2. The modem according to claim 1 wherein,
    said transmitting means comprises means responsive to digital data signals in a base-band for shifting the frequency of said signals into said first pass-band portion by a first carrier frequency that is in substantially the middle of said first bandwidth portion,
    said receiving means comprises means responsive to analog signals in a second pass-band portion received from a telephone circuit for shifting their frequency into a baseband by a second carrier frequency that is in substantially the middle of said second bandwidth portion, and
    said subtracting means comprises means responsive to base-band digital data signals in said transmitting means for subtracting from a received digital data base-band signal a cancellation signal derived from a time varying system dependent upon said first and second carrier frequencies.

3. A telephone modem capable of simultaneously transmitting and receiving data signals over a common telephone circuit of a given usable bandwidth, comprising:
    means converting digital signals into analog signals for transmitting said analog signals through said telephone circuit, said transmitting means including means responsive to digital data signals in a base-band for shifting the frequency of said signals by use of a first carrier frequency,
    means receiving analog signals from said telephone circuit for converting those signals into digital signals, said receiving means including means responsive to analog signals from said telephone circuit shifting their frequency by a second carrier frequency into a base-band, and means responsive to base-band digital data signals in said transmitting means for subtracting from a received digital data base-band signal portions of a transmitted signal occurring in the received signal, thereby to suppress any local echo and reduce the error rate from such echos, said subtracting means including means for multiplying the base-band signals from the transmitting means by a time varying function derived from said first and second carrier frequencies.

4. A method of simultaneously communicating data signals in two directions between terminals over a common telephone circuit of a given bandwidth, comprising the steps of:

confining said data signals in one direction to a first bandwidth portion and said data signals in the other direction to a second bandwidth portion of said telephone circuit bandwidth, said bandwidth portions cummulatively substantially filling said telephone circuit bandwidth and overlapping an amount in about its middle, significantly attenuating at each terminal all frequencies outside of one of said bandwidth portions in an amount wherein signals reflected from the opposite terminal within said one of said bandwidth portions are attenuated to levels that do not excessively interfere with the receipt of a signal within said one of said bandwidth portions, and cancelling from the signal received at each terminal in one of the bandwidth portions any signal transmitted at that terminal that is within said received bandwidth portion, thereby to cancel local echos, whereby the given bandwidth of the telephone circuit is fully utilized, resulting in high speed full duplex data transmission over said telephone circuit.

5. A method of transmitting digital data with less than a given error rate in two directions over a voice dial-up telephone circuit that is of a given bandwidth and includes at least a portion wherein signals travel in both directions over a common circuit, comprising the steps of:

converting the digital data originating at one end of the telephone circuit into analog signals within a first pass-band and receiving and decoding into digital data those signals at another end of said telephone circuit, converting the digital data originating at said another end of the telephone circuit into analog signals within a second pass-band and receiving and decoding into digital data those signals at said one end of said telephone circuit, said first and second pass-band portions each being a different substantially one-half of said telephone circuit bandwidth arranged to occupy substantially the entire telephone circuit bandwidth, said first and second bandwidth portions overlapping in frequency passband in about the middle of said usable bandwidth and in an amount that local echo signals would normally result in an error rate in excess of said given error rate but remote signal echo would normally result in an error rate less than said given error rate, cancelling from the digital signal received at said one end components thereof originating at said one end, thereby to substantially eliminate local echo signals at said one end, and cancelling from the digital signal received at said another end components thereof originating at said another end, thereby to substantially eliminate local echo signals at said another end, whereby utilization of the telephone circuit given bandwidth is maximized for high speed full duplex data transmission.

6. The method according to claim 5 wherein the cancelling steps each include the step of deriving a cancellation signal from the digital signal being transmitted at their respective end of the telephone circuit and from a difference in frequency of said first and second pass-band portions.

7. A method of transmitting digital data with less than a given error rate in two directions over a voice dial-up telephone circuit that is of a given bandwidth and includes at least a portion wherein signals travel in both directions over a common circuit, comprising the steps of:

converting the digital data originating at one end of the telephone circuit in a base band into analog signals within a first pass-band having a first carrier frequency and receiving and decoding into digital data those signals at another end of said telephone circuit, converting the digital data originating at said another end of the telephone circuit in the base band into analog signals within a second pass-band having a second carrier frequency and receiving and decoding into digital data those signals at said one end of said telephone circuit, said first and second pass-band portions each being a different substantially one-half of said telephone circuit bandwidth arranged to occupy substantially the entire telephone circuit bandwidth, said first and second bandwidth portions overlapping in frequency pass-band in about the middle of said usable bandwidth and in an amount that local echo signals would normally result in an error rate in excess of said given error rate but remote signal echo would normally result in an error rate less than said given error rate, canceling from the digital signal received at said one end with the second pass-band components thereof originating at said one end, said cancellation being performed substantially entirely within the base-band by subtracting from the received digital signal a time-varying signal that is (1) derived from the digital signal originating at said one end and (2) includes a time-varying factor derived from a difference between said first and second carrier frequencies, thereby to substantially eliminate local echo signals at said one end, and canceling from the digital signal received at said another end within the first pass-band components thereof originating at said another end, said cancellation being performed substantially entirely within the base-band by subtracting from the received digital signal a time-varying signal that is (1) derived from the digital signal originating at said another end and (2) includes a time-varying factor derived from a difference between said first and second carrier frequencies, thereby to substantially eliminate local echo signals at said another end, whereby utilization of the telephone circuit given bandwidth is maximized for high speed full duplex data transmission.

* * * * *